(12) United States Patent
Errico et al.

(10) Patent No.: US 11,465,232 B2
(45) Date of Patent: Oct. 11, 2022

(54) LASER PATTERNING SKEW CORRECTION

(71) Applicant: nLIGHT, Inc., Vancouver, WA (US)

(72) Inventors: Vito P. Errico, Vancouver, WA (US); Roger C. Shipman, Aurora, OR (US)

(73) Assignee: nLIGHT, Inc., Camas, WA (US)

( * ) Notice: Subject to any disclaimer, the term of this patent is extended or adjusted under 35 U.S.C. 154(b) by 169 days.

(21) Appl. No.: 16/847,286

(22) Filed: Apr. 13, 2020

(65) Prior Publication Data

US 2020/0238435 A1 Jul. 30, 2020

Related U.S. Application Data

(62) Division of application No. 14/296,722, filed on Jun. 5, 2014, now Pat. No. 10,618,131.

(51) Int. Cl.
*B23K 26/03* (2006.01)
*B23K 26/08* (2014.01)
*B23K 26/082* (2014.01)

(52) U.S. Cl.
CPC .......... *B23K 26/032* (2013.01); *B23K 26/082* (2015.10); *B23K 26/0846* (2013.01)

(58) Field of Classification Search
CPC . B23K 26/032; B23K 26/082; B23K 26/0846
USPC .............. 219/121.78, 121.79, 121.8, 121.81, 219/121.83
See application file for complete search history.

(56) References Cited

U.S. PATENT DOCUMENTS

| | | |
|---|---|---|
| 3,388,461 A | 6/1968 | Lins |
| 4,315,666 A | 2/1982 | Hicks, Jr. |
| 4,713,518 A | 12/1987 | Yamazaki et al. |
| 4,863,538 A | 9/1989 | Deckard |
| 4,953,947 A | 9/1990 | Bhagavatula |
| 5,008,555 A | 4/1991 | Mundy |
| 5,082,349 A | 1/1992 | Cordova-Plaza et al. |
| 5,129,014 A * | 7/1992 | Bloomberg .......... G06V 10/245 382/257 |
| 5,252,991 A | 10/1993 | Storlie et al. |

(Continued)

FOREIGN PATENT DOCUMENTS

| | | |
|---|---|---|
| CA | 2292974 A1 | 6/2000 |
| CN | 1217030 C | 8/2005 |

(Continued)

OTHER PUBLICATIONS

Chen et al., "An On-Machine Error Calibration Method for a Laser Micromachining Tool," Precision Engineering, 47:239-248 (Jan. 31, 2017).

(Continued)

*Primary Examiner* — Jimmy Chou
(74) *Attorney, Agent, or Firm* — Klarquist Sparkman, LLP (57) ABSTRACT

A laser patterning alignment method provides a way to position a target at a working distance in a laser patterning system such that fiducial marks on the target are positioned in view of at least three laser patterning system cameras, and with each laser patterning system camera, to locate a fiducial mark on the target and sending location data of the located fiducial mark to a controller, to determine corrections required to align expected fiducial mark locations with the sent fiducial mark location data, and to adjust the laser patterning system with the determined corrections.

7 Claims, 5 Drawing Sheets

(56) References Cited

U.S. PATENT DOCUMENTS

| | | | |
|---|---|---|---|
| 5,509,597 A * | 4/1996 | Laferriere | H05K 3/3421 228/248.1 |
| 5,523,543 A * | 6/1996 | Hunter, Jr. | B23K 26/382 219/121.62 |
| 5,530,221 A | 6/1996 | Benda et al. | |
| 5,566,196 A | 10/1996 | Scifres | |
| 5,642,198 A * | 6/1997 | Long | G01N 21/896 356/430 |
| 5,719,386 A * | 2/1998 | Hsieh | G06V 10/22 235/470 |
| 5,837,962 A | 11/1998 | Overbeck | |
| 5,932,119 A * | 8/1999 | Kaplan | G01N 21/87 219/121.68 |
| 6,180,912 B1 | 1/2001 | Tatah | |
| 6,192,171 B1 | 2/2001 | Goodman et al. | |
| RE37,585 E | 3/2002 | Mourou et al. | |
| 6,353,203 B1 | 3/2002 | Hokodate et al. | |
| 6,360,042 B1 | 3/2002 | Long | |
| 6,362,004 B1 * | 3/2002 | Noblett | B01J 19/0046 356/244 |
| 6,426,840 B1 | 7/2002 | Partanen et al. | |
| 6,434,302 B1 | 8/2002 | Fidric et al. | |
| 6,477,301 B1 | 11/2002 | Anthon et al. | |
| 6,490,376 B1 | 12/2002 | Au et al. | |
| 6,577,314 B1 | 6/2003 | Yoshida et al. | |
| 6,600,149 B2 | 7/2003 | Schulz et al. | |
| 7,027,155 B2 * | 4/2006 | Cordingley | B23K 26/0622 257/E23.15 |
| 7,151,788 B2 | 12/2006 | Imakado et al. | |
| 7,154,530 B2 * | 12/2006 | Andrews | B23Q 35/128 348/86 |
| 7,231,063 B2 | 6/2007 | Naimark et al. | |
| 7,349,123 B2 | 3/2008 | Clarke et al. | |
| 7,437,041 B2 | 10/2008 | Po | |
| 7,456,372 B2 * | 11/2008 | Hiramatsu | B23K 26/0665 219/121.7 |
| 7,622,710 B2 | 11/2009 | Gluckstad | |
| 7,628,865 B2 | 12/2009 | Singh | |
| 7,781,778 B2 | 8/2010 | Moon et al. | |
| 7,834,293 B2 * | 11/2010 | Wile | B23K 26/40 219/121.69 |
| 8,024,060 B2 * | 9/2011 | Alpay | B23K 26/38 700/184 |
| 8,071,912 B2 | 12/2011 | Costin, Sr. et al. | |
| 8,084,713 B2 * | 12/2011 | Idaka | B23K 26/082 700/166 |
| 8,158,493 B2 * | 4/2012 | Shah | B23K 26/0624 257/E21.48 |
| 8,237,788 B2 * | 8/2012 | Cooper | B33Y 40/00 356/616 |
| 8,251,475 B2 | 8/2012 | Murray et al. | |
| 8,258,426 B2 * | 9/2012 | Zhang | B23K 26/0624 219/121.68 |
| 8,269,108 B2 | 9/2012 | Kunishi et al. | |
| 8,288,679 B2 | 10/2012 | Unrath | |
| 8,310,009 B2 | 11/2012 | Saran et al. | |
| 8,404,998 B2 | 3/2013 | Unrath et al. | |
| 8,414,264 B2 * | 4/2013 | Bolms | F01D 5/005 382/152 |
| 8,415,613 B2 | 4/2013 | Heyn et al. | |
| 8,442,303 B2 * | 5/2013 | Cheng | G06T 7/586 382/154 |
| 8,472,099 B2 | 6/2013 | Fujino et al. | |
| 8,809,734 B2 | 8/2014 | Cordingley et al. | |
| 8,958,144 B2 | 2/2015 | Rataj et al. | |
| 9,496,683 B1 | 11/2016 | Kanskar | |
| 9,537,042 B2 | 1/2017 | Dittli et al. | |
| 10,048,661 B2 | 8/2018 | Arthur et al. | |
| 10,112,262 B2 | 10/2018 | Cheverton et al. | |
| 10,207,489 B2 | 2/2019 | Dave et al. | |
| 10,295,820 B2 * | 5/2019 | Small | G02B 26/105 |
| 10,646,963 B2 | 5/2020 | Victor et al. | |
| 10,656,427 B2 | 5/2020 | Rivera et al. | |
| 10,656,440 B2 | 5/2020 | Kliner et al. | |
| 10,663,767 B2 | 5/2020 | Kliner et al. | |
| 10,670,872 B2 | 6/2020 | Karlsen et al. | |
| 10,705,348 B2 | 7/2020 | Martinsen et al. | |
| 10,730,785 B2 | 8/2020 | Brown et al. | |
| 10,751,834 B2 | 8/2020 | Koponen et al. | |
| 10,971,885 B2 | 4/2021 | Kliner et al. | |
| 11,137,738 B2 * | 10/2021 | Shapiro | G05B 19/19 |
| 11,173,548 B2 * | 11/2021 | Small | B33Y 30/00 |
| 2001/0045149 A1 | 11/2001 | Dunsky et al. | |
| 2001/0050364 A1 | 12/2001 | Tanaka et al. | |
| 2003/0024913 A1 * | 2/2003 | Downes | H05K 1/0266 219/121.68 |
| 2003/0174387 A1 | 9/2003 | Eggleton et al. | |
| 2003/0178398 A1 * | 9/2003 | Nagatoshi | B23K 26/0853 219/121.81 |
| 2003/0213998 A1 | 11/2003 | Hsu et al. | |
| 2004/0031779 A1 | 2/2004 | Cahill et al. | |
| 2004/0105092 A1 * | 6/2004 | Iwata | B23K 26/032 356/237.2 |
| 2004/0112634 A1 | 6/2004 | Tanaka et al. | |
| 2004/0207936 A1 | 10/2004 | Yamamoto et al. | |
| 2004/0222197 A1 * | 11/2004 | Hiramatsu | B23K 26/0853 700/166 |
| 2004/0247222 A1 | 12/2004 | Park | |
| 2005/0168847 A1 | 8/2005 | Sasaki | |
| 2005/0171630 A1 * | 8/2005 | Dinauer | B23K 26/082 700/166 |
| 2005/0191017 A1 | 9/2005 | Croteau et al. | |
| 2005/0233557 A1 | 10/2005 | Tanaka et al. | |
| 2005/0263498 A1 * | 12/2005 | Hiramatsu | B23K 26/04 219/121.7 |
| 2006/0138097 A1 * | 6/2006 | Hiramatsu | B23K 26/0665 219/121.7 |
| 2006/0215976 A1 | 9/2006 | Singh et al. | |
| 2006/0275705 A1 | 12/2006 | Dorogy et al. | |
| 2007/0075060 A1 | 4/2007 | Shedlov et al. | |
| 2007/0206900 A1 | 9/2007 | Po | |
| 2007/0251543 A1 | 11/2007 | Singh | |
| 2008/0231939 A1 | 9/2008 | Gluckstad | |
| 2008/0246024 A1 | 10/2008 | Touwslager et al. | |
| 2008/0251504 A1 | 10/2008 | Lu et al. | |
| 2009/0007933 A1 * | 1/2009 | Thomas | B23K 26/361 219/121.81 |
| 2009/0120916 A1 * | 5/2009 | Bruce | B23K 1/0056 219/121.65 |
| 2009/0122377 A1 | 5/2009 | Wagner | |
| 2009/0202191 A1 | 8/2009 | Ramachandran | |
| 2009/0255911 A1 * | 10/2009 | Krishnaswami | B23K 26/083 219/121.76 |
| 2009/0274833 A1 | 11/2009 | Li | |
| 2009/0297140 A1 | 12/2009 | Heismann et al. | |
| 2009/0314752 A1 * | 12/2009 | Manens | B23K 26/40 219/121.69 |
| 2009/0324233 A1 | 12/2009 | Samartsev et al. | |
| 2010/0025387 A1 * | 2/2010 | Arai | B29C 65/1654 219/121.73 |
| 2010/0150201 A1 | 6/2010 | Shin et al. | |
| 2010/0155379 A1 * | 6/2010 | Shamoun | H01L 31/022425 219/121.68 |
| 2010/0225974 A1 | 9/2010 | Sandstrom | |
| 2010/0230665 A1 | 9/2010 | Verschuren et al. | |
| 2010/0251437 A1 | 9/2010 | Heyn et al. | |
| 2010/0252543 A1 * | 10/2010 | Manens | B23K 26/082 219/121.68 |
| 2010/0257641 A1 * | 10/2010 | Perkins | G01Q 10/065 250/252.1 |
| 2010/0292947 A1 * | 11/2010 | Buk | B23K 26/082 702/94 |
| 2010/0294746 A1 * | 11/2010 | Bann | B23K 26/082 219/121.68 |
| 2010/0326969 A1 | 12/2010 | Tsukamoto et al. | |
| 2011/0080476 A1 * | 4/2011 | Dinauer | G05B 19/401 382/141 |
| 2011/0127697 A1 | 6/2011 | Milne | |
| 2011/0133365 A1 | 6/2011 | Ushimaru et al. | |
| 2011/0187025 A1 | 8/2011 | Costin, Sr. | |
| 2011/0249940 A1 | 10/2011 | Sasaoka et al. | |

(56) References Cited

U.S. PATENT DOCUMENTS

| | | |
|---|---|---|
| 2011/0278277 A1 | 11/2011 | Stork Genannt Wersborg |
| 2011/0279826 A1 | 11/2011 | Miura et al. |
| 2012/0127097 A1 | 5/2012 | Gaynor et al. |
| 2012/0145685 A1* | 6/2012 | Ream .................. G02B 26/126 219/121.67 |
| 2012/0148823 A1 | 6/2012 | Chu |
| 2012/0156458 A1 | 6/2012 | Chu |
| 2012/0211555 A1* | 8/2012 | Rowe .................. G06K 7/1404 235/375 |
| 2012/0241419 A1* | 9/2012 | Rumsby ............... B23K 26/355 219/121.6 |
| 2012/0263448 A1* | 10/2012 | Winter ................. H04N 13/243 396/325 |
| 2012/0295071 A1 | 11/2012 | Sato |
| 2012/0301733 A1 | 11/2012 | Eckert et al. |
| 2012/0301737 A1 | 11/2012 | Labelle et al. |
| 2013/0005139 A1 | 1/2013 | Krasnov et al. |
| 2013/0022754 A1 | 1/2013 | Bennett et al. |
| 2013/0023086 A1 | 1/2013 | Chikama et al. |
| 2013/0027648 A1 | 1/2013 | Moriwaki |
| 2013/0044768 A1 | 2/2013 | Ter-Mikirtychev |
| 2013/0095260 A1 | 4/2013 | Bovatsek et al. |
| 2013/0134637 A1 | 5/2013 | Wiesner et al. |
| 2013/0186871 A1* | 7/2013 | Suzuki ............... B23K 26/0665 219/121.81 |
| 2013/0228442 A1 | 9/2013 | Mohaptatra et al. |
| 2013/0294728 A1 | 11/2013 | Rockwell |
| 2013/0299468 A1 | 11/2013 | Unrath et al. |
| 2014/0104618 A1 | 4/2014 | Potsaid et al. |
| 2014/0155873 A1 | 6/2014 | Bor |
| 2014/0245608 A1* | 9/2014 | Morimoto ............. B41J 2/1603 219/121.75 |
| 2014/0259589 A1 | 9/2014 | Xu et al. |
| 2014/0271328 A1 | 9/2014 | Burris et al. |
| 2014/0319381 A1 | 10/2014 | Gross |
| 2014/0332254 A1 | 11/2014 | Pellerite et al. |
| 2014/0333931 A1 | 11/2014 | Lu et al. |
| 2015/0086159 A1 | 3/2015 | Salokatve et al. |
| 2015/0165556 A1 | 6/2015 | Jones et al. |
| 2015/0314612 A1 | 11/2015 | Balasini et al. |
| 2015/0352664 A1 | 12/2015 | Errico et al. |
| 2016/0059354 A1 | 3/2016 | Sercel et al. |
| 2016/0158889 A1 | 6/2016 | Carter et al. |
| 2016/0175935 A1 | 6/2016 | Ladewig et al. |
| 2016/0179064 A1 | 6/2016 | Arthur et al. |
| 2016/0187646 A1 | 6/2016 | Ehrmann |
| 2016/0294150 A1 | 10/2016 | Johnson |
| 2017/0036299 A1 | 2/2017 | Goya et al. |
| 2017/0090462 A1 | 3/2017 | Dave et al. |
| 2018/0154484 A1 | 6/2018 | Hall |
| 2018/0193956 A1* | 7/2018 | Ostroverkhov ....... B29C 64/393 |
| 2019/0217422 A1 | 7/2019 | Kramer et al. |
| 2019/0270161 A1 | 9/2019 | Allenberg-Rabe et al. |
| 2020/0251237 A1 | 8/2020 | Gross |
| 2020/0263978 A1 | 8/2020 | Pieger et al. |
| 2020/0333640 A1 | 10/2020 | Kliner et al. |

FOREIGN PATENT DOCUMENTS

| | | |
|---|---|---|
| CN | 1926460 | 3/2007 |
| CN | 1966224 | 5/2007 |
| CN | 101133351 A | 2/2008 |
| CN | 101143405 | 3/2008 |
| CN | 101303269 | 11/2008 |
| CN | 101314196 | 12/2008 |
| CN | 101403822 | 4/2009 |
| CN | 101733561 | 6/2010 |
| CN | 101821081 | 9/2010 |
| CN | 101836309 | 9/2010 |
| CN | 201783759 | 4/2011 |
| CN | 102084282 | 6/2011 |
| CN | 102176104 | 9/2011 |
| CN | 102207618 | 10/2011 |
| CN | 102289072 | 12/2011 |
| CN | 102301200 | 12/2011 |
| CN | 102441740 | 5/2012 |
| CN | 102448623 | 5/2012 |
| CN | 102549377 | 7/2012 |
| CN | 102640026 | 8/2012 |
| CN | 104475970 | 4/2015 |
| CN | 104704821 | 6/2015 |
| CN | 104759623 | 7/2015 |
| CN | 104979748 | 10/2015 |
| CN | 105163894 | 12/2015 |
| CN | 105290610 | 2/2016 |
| CN | 105365215 | 3/2016 |
| CN | 105682900 | 6/2016 |
| CN | 105965015 | 9/2016 |
| CN | 106163703 | 11/2016 |
| CN | 106163774 | 11/2016 |
| CN | 106180712 | 12/2016 |
| CN | 106312567 | 1/2017 |
| CN | 206010148 | 3/2017 |
| CN | 106660123 | 5/2017 |
| CN | 102582274 | 7/2019 |
| DE | 4437284 | 4/1996 |
| DE | 203 20 269 | 4/2004 |
| DE | 202016004237 | 8/2016 |
| DE | 102015103127 | 9/2016 |
| EP | 0048855 | 5/1982 |
| EP | 1238745 | 9/2002 |
| EP | 1340583 | 9/2003 |
| EP | 1974848 | 10/2008 |
| EP | 2587564 | 5/2013 |
| EP | 2642246 | 9/2013 |
| JP | 60046892 | 3/1985 |
| JP | H02220314 | 9/1990 |
| JP | 10282450 | 10/1998 |
| JP | H11-231138 | 8/1999 |
| JP | 2005-203430 | 7/2005 |
| JP | 2006-098085 | 4/2006 |
| JP | 2006-106227 | 4/2006 |
| JP | 2006-285234 | 10/2006 |
| JP | 2007-518566 | 7/2007 |
| JP | 4112355 | 7/2008 |
| JP | 2008-281395 | 11/2008 |
| JP | 2009-193070 | 8/2009 |
| JP | 2015-500571 | 1/2015 |
| JP | 2015-196265 | 11/2015 |
| KR | 10-2011-0109957 | 10/2011 |
| RU | 2008742 | 2/1994 |
| RU | 2021881 | 10/1994 |
| TW | 504425 | 10/2002 |
| TW | 553430 | 9/2003 |
| TW | 200633062 | 9/2006 |
| TW | I271904 | 1/2007 |
| TW | 200707466 | 2/2007 |
| TW | 201307949 | 2/2013 |
| WO | WO 1995/011100 | 4/1995 |
| WO | WO 1995/011101 | 4/1995 |
| WO | WO 01/74529 | 10/2001 |
| WO | WO 2005/053895 A1 | 6/2005 |
| WO | WO 2009/155536 | 12/2009 |
| WO | WO 2012/088361 | 6/2012 |
| WO | WO 2012/102655 | 8/2012 |
| WO | WO 2013/086227 | 6/2013 |
| WO | WO 2015/146591 | 10/2015 |
| WO | WO 2016/059938 | 4/2016 |
| WO | WO 2016/085334 | 6/2016 |
| WO | WO 2016/156824 | 10/2016 |

OTHER PUBLICATIONS

Chiumenti et al., "Numerical Simulation and Experimental Calibration of Additive Manufacturing by Blown Powder Technology," Rapid Prototyping Journal, 23(2), 27 pages (Mar. 20, 2017).

Uden et al., "Ultra-high-density spatial division multiplexing with a few-mode multicore fibre," Nature Photonics, 8(11):865-870 (Nov. 2014).

Villatoro et al., "Photonic Crystal Fiber Interferometric Vector Bending Sensor," Optics Letters, 40(13):3113-3116 (Jul. 1, 2015).

(56) References Cited

OTHER PUBLICATIONS

Willis et al., "Printed Optics: 3D Printing of Embedded Optical Elements for Interactive Devices," UIST 12: Proceedings of the 25th annual ACM symposium on user interface softward and technology, 10 pages (Oct. 31, 2012).

Yoda et al., "Beam Quality Factor of Higher Order Modes in a Step-Index Fiber," Journal of Lightwave Technology, 24(3):1350-1355 (Mar. 2006).

Affine Transformation—from Wolfram MathWorld, http://mathworld.wolfram.com/AffineTransformation.html, downloaded Feb. 21, 2014, 2 pages.

Chen et al., "An Algorithm for Correction of Distortion of Laser Marking Systems," IEEE International Conference on Control and Automation, Guangzhou, China, 5 pages (May 30-Jun. 1, 2007).

Chung, "Solution-Processed Flexible Transparent Conductors Composed of Silver Nanowire Networks Embedded in Indium Tin Oxide Nanoparticle Matrices," Nano Research, 10 pages (Sep. 24, 2012).

Cui, et al., "Calibration of a laser galvanometric scanning system by adapting a camera model," *Applied Optics* 48(14):2632-2637 (Jun. 2009).

Gardner, "Precision Photolithography on Flexible Substrates," http://azorescorp.com/downloads/Articles/AZORESFlexSubstrate.pdf (prior to Jan. 30, 2013).

Giannini et al., "Anticipating, measuring, and minimizing MEMS mirror scan error to improve laser scanning microscopy's speed and accuracy," PLOS ONE, 14 pages (Oct. 3, 2017).

Grigoriyants et al., "Tekhnologicheskie protsessy lazernoy obrabotki," Moscow, izdatelstvo MGTU im. N.E. Baumana, p. 334 (2006).

Java—Transform a triangle to another triangle—Stack Overflow, http://stackoverflow.com/questions/1114257/transform-a-triangle-to-another-triangle?lq=1, downloaded Feb. 21, 2014, 3 pages.

Ludtke, et al., "Calibration of Galvanometric Laser Scanners Using Statistical Learning Methods," *Bildverabeitung für die Medizin*, pp. 467-472 (Feb. 25, 2015).

Manakov, et al., "A Mathematical Model and Calibration Procedure for Galvanometric Laser Scanning Systems," *Vision, Modeling, and Visualization*, 8 pages (Jan. 2011).

PCI-6110, Multifunction I/O Device, http://www.ni.com/en-us-support/model.pci-6110.html, downloaded Dec. 15, 2017, 1 page.

Product Brochure entitled "3-Axis and High Power Scanning" by Cambridge Technology, 4 pages, downloaded Dec. 21, 2013.

Product Brochure supplement entitled "Theory of Operation" by Cambridge Technology, 2 pages, downloaded Dec. 21, 2013.

Xie et al., "Correction of the image distortion for laser galvanometric scanning system," Optics & Laser Technology, 37:305-311 (Jun. 2005).

3-Axis Laser Scanning Systems, downloaded from http://www.camtech.com/index.php?option=com_content&view=article&id=131&Itemid=181, 4 pages, Dec. 31, 2014.

\* cited by examiner

LASER PATTERNING SKEW CORRECTION

CROSS REFERENCE TO RELATED APPLICATION

This application is a divisional of U.S. patent application Ser. No. 14/296,722, filed Jun. 5, 2014, which is incorporated by reference herein.

FIELD

Generally, the field of the present invention is laser patterning. More particularly, the present invention relates to correcting for orientation of a workpiece in relation to one or more lasers.

BACKGROUND

Strong demand for smaller and more portable computing devices has led to substantial innovation in many corresponding areas, including touch screens for smartphones and tablet computers. However, the path of innovation has not kept pace with manufacturing, particularly in the area of touch sensor patterning and printed electronics. Existing technologies, including photolithography, screen printing, and laser processing, suffer from poor takt (cycle) times due in part to the number of processing steps required. In addition to costs associated with poor cycle time, photolithographic and screen printing techniques include numerous drawbacks, including increased cost associated with expensive consumables and toxic waste. Conventional laser processing techniques also suffer from numerous drawbacks, including misalignment between laser system and processing targets. Thus, it is unfortunate that the current state of the art has yet to produce an efficient and superior technique for processing printed electronics and touch sensors on substrates. Accordingly, there remains a need for methods for processing substrates without the attendant drawbacks.

SUMMARY

According to one aspect of the present invention, a laser patterning alignment method includes steps of positioning a target at a working distance in a laser patterning system such that fiducial marks on the target are positioned in view of at least three laser patterning system cameras, locating a fiducial mark on the target with each laser patterning system camera, and sending location data of the located fiducial marks to a controller, determining corrections required to align expected fiducial mark locations with the sent fiducial mark location data, and adjusting the laser patterning system with the determined corrections.

According to another aspect of the present invention, a laser patterning alignment system includes three or more cameras positioned in relation to a system laser scanning field and each configured to detect fiducial marks in view thereof, at least one laser scanner configured to scan corresponding laser beams in the system laser scanning field for processing a target therein using expected fiducial mark data to define the system laser scanning field, and a controller configured to receive from the three or more cameras detected fiducial mark data and configured to adjust the system laser scanning field based on the detected fiducial mark data such that the at least one laser scanner is configured to scan beams according to the adjusted system laser scanning field.

A method of high-precision laser material processing on a laser patterning target, including aligning three or more cameras in relation to expected fiducial mark locations that are illuminated by one or more laser beams scannable in a laser scanning field defined at least in part by the expected fiducial mark locations, loading a first target having actual fiducial marks thereon such that the actual fiducial marks are in view of the three or more cameras, detecting the actual fiducial mark locations on the first target and sending the detected actual fiducial mark locations to a controller, determining in the controller an affine transformation laser scanning field correction and applying the affine transformation laser scanning field correction to the laser scanning field such that the one or more laser beams are scannable in the corrected laser scanning field, and processing the first target using the corrected laser scanning field.

The foregoing and other objects, features, and advantages of the invention will become more apparent from the following detailed description, which proceeds with reference to the accompanying figures.

DETAILED DESCRIPTION

Laser scanning systems provide one or more beams to a target surface in order to process one or more materials in the field of view of the scanned beams. Processing can occur with lasers of different wavelengths, different type (i.e., pulsed or continuous-wave), and with various configurable beam, pulse, or movement parameters. Various materials can be processed with lasers, including thin films, such as transparent conductive films, composite structures, as well as more rigid surfaces such as glass and metal. For some applications, laser beams are scanned with high precision across a target in a complex pattern provided by a pattern file and controller. Such high precision laser patterning can replace conventional approaches, such as photolithography or screen printing, and provide attendant advantages.

In laser scanning systems and methods herein, one or more laser scanners can be used to scan lasers beams across a global laser field to process a target area. In examples with a plurality of scanners, separate laser fields are stitched together in order to process the target area. Processing areas typically encompass all or a portion of sheets or rolls of material. However, as each new sheet or portion of a roll is queued up to be processed in relation to the one or more laser beam scanners and associated laser scanning fields, the position of the sheet or portion of a roll may not align with the expected area to be scanned by the lasers. A mismatch of even a few microns can be unacceptable for many materials processing applications, particularly in precision-demanding technologies, such as in the manufacturing of printed electronics, smartphones, and other electronic gadgets, or where multiple processing steps are performed requiring accurate placement in relation to processing performed in previous or subsequent steps. Providing accuracy in the laser scanning of large fields or with several adjacent overlapping laser fields presents a challenge, particularly as errors can compound across scanning fields or where scanning fields are large.

In order to align a material target in relation to the scanning fields of the one or more lasers, skew correction is applied to align three or more preexisting fiducial marks on the material target with three mark locations stored in a pattern data file. The misalignment can be captured by three or more cameras configured to detect for the preexisting fiducial marks in relation to expected mark location. Instead of performing mechanical operations to adjust the position of the material target itself, the alignment is performed through operations that correct the shape of the one or more laser scanning fields. A material target can be processed and removed from view of the laser scanning fields to make room for a new material target, such as a separate sheet or another portion of an roll advanced to a new position. Since the methods herein for making correction to the laser scanning fields can occur relatively fast, subsequent material targets can be expediently aligned for the processing thereof.

Figure 1:
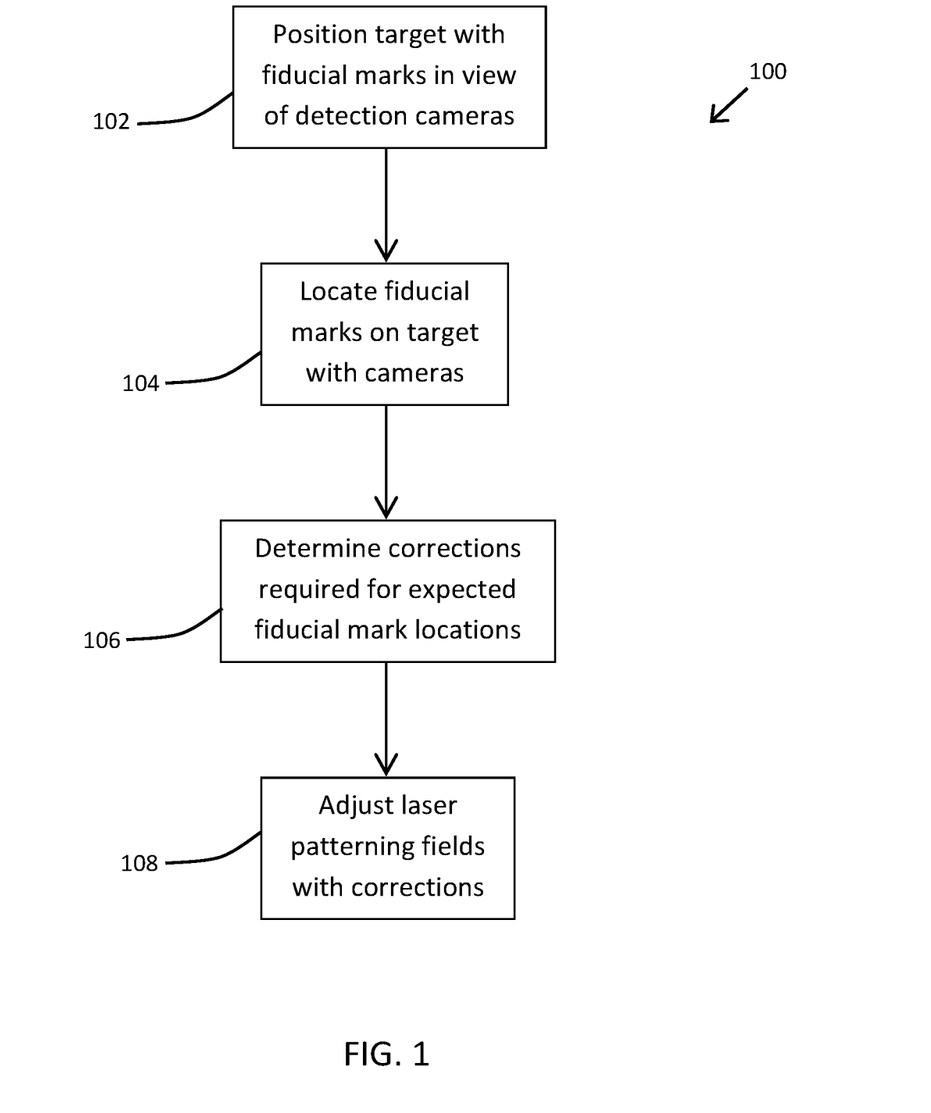
FIG. 1 is a flow chart of a method in accordance with an aspect of the present invention.

FIG. 1 shows an exemplary method 100 for aligning a laser patterning material target in relation to one or more laser scanning fields. At 102, a material target is moved into position for processing and in view of a plurality of detectors, such as cameras. Fine movements can be applied to the target prior to detection by the cameras, or in conjunction with detection. At 104, a plurality of fiducial marks predisposed on the target are located or detected by a respective camera. At 106, one or more corrections are determined that would cause the position of the actual fiducial marks on the target to align with expected fiducial mark locations that are stored in a controller. At 108, one or more laser scanning fields associated with high precision laser sources, such as fiber lasers, are adjusted in the controller based on the previously determined corrections.

Thus, even though the material target does not line up with the position expected by the controller, the scanning fields can be corrected such that scanned beams pattern the target in a corrected fashion. The corrections determined in 106 and applied to the fields in 108 can be done in series or parallel. For example, a correction for translation of one expected fiducial mark location can be updated in a scanning field data file and a correction for rotation of another expected mark location can be updated in the scanning field data file, or corrections for translation and rotation can be performed and the scanning field data file can be updated with both corrections. Different corrections can be applied to the expected fiducial mark locations, including corrections for scale, translation, rotation, and shear. By using at least three fiducial marks on the target, most misalignment of the target with respect to stored laser scanning field data can be corrected. For example, with multiple scanning fields that are adjacent or overlapping, a global coordinate system can be used to efficiently extend corrections to each of the component scanning fields using the aforementioned three fiducials. More than three fiducials may also be used, including fiducials associated with particular component scanning fields.

Figure 2:
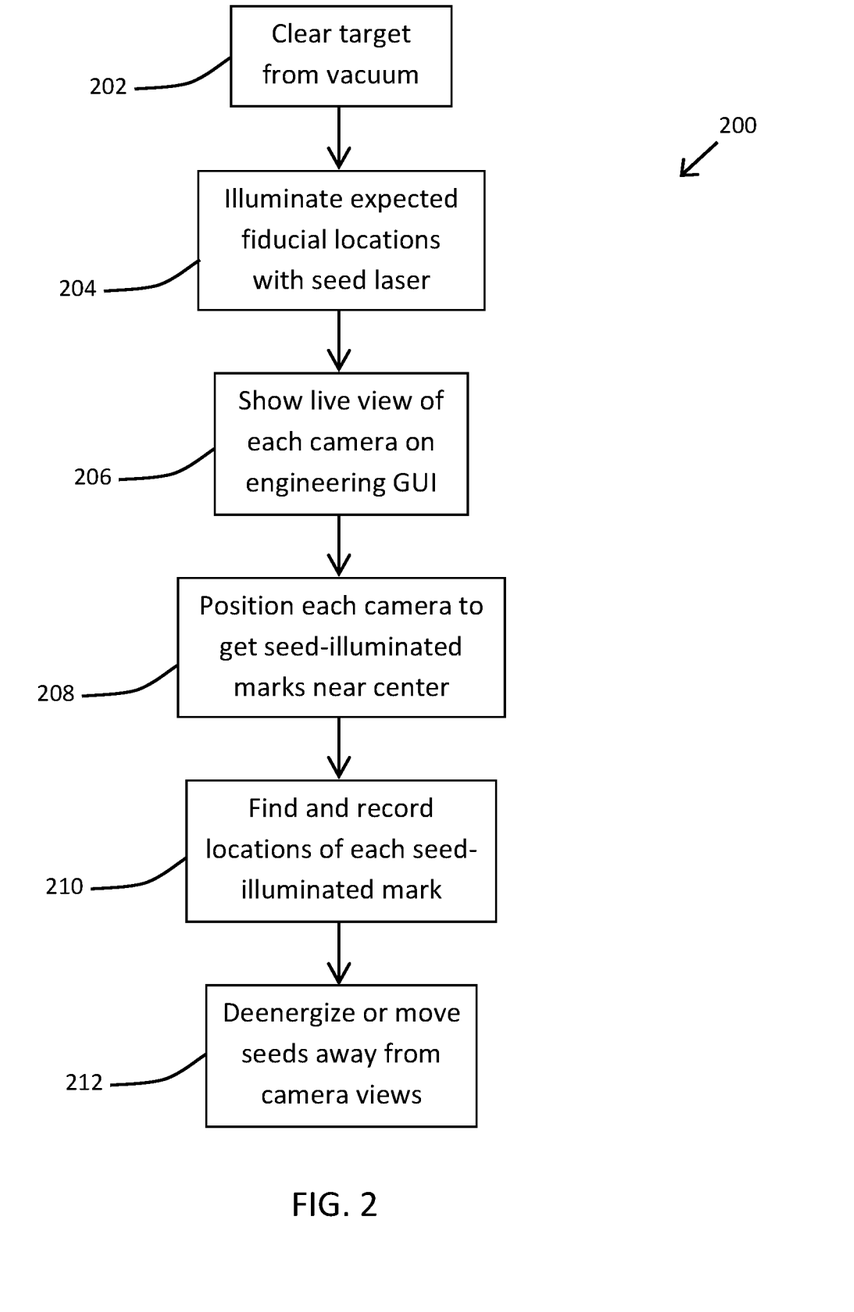
FIG. 2 is a flow chart of a method in accordance with another aspect of the present invention.

In laser patterning manufacturing, tolerances in the range of microns can be required, and methods to provide alignment corrections herein can be applied to single or multiple-scanning field laser scanning systems to reduce misalignment and enable such high precision manufacturing. In order to provide the detectors in a configuration that supports rapid detection of fiducial marks on a material target, detectors should be positioned in locations associated with expected locations of target material fiducials. In FIG. 2 an exemplary method 200 is shown for providing detection cameras in position for detecting target to target variation in actual fiducial mark location. At 202, a target is cleared from a vacuum chuck used to secure the target in position below one or more laser scanning fields. At 204, expected fiducial mark locations, from location data in a laser patterning system data file, are illuminated using one or more seed lasers associated with the corresponding laser scanning field. For example, for two adjacent and overlapping laser scan fields, two fiducial marks can be located on a target in one of the scanning fields while a third fiducial mark can be located on the target in the other scanning field. At 206, a live view of each camera is shown on an engineering graphical user interface. At 208, each camera is positioned, for example, with digital encoders, by hand, or other means, such that the laser seed beam illuminations are near the center of view of the camera. At 210, the locations of each seed-illuminated fiducial mark are found and recorded for purposes of logging, comparisons with other location data, or for manipulation of location data. For example, the detected location of seed-illuminated marks can be recorded as camera coordinate system data and translated into laser coordinate system data. At 212, the scanning beams are de-energized or moved away from the view of the cameras.

Figure 3:
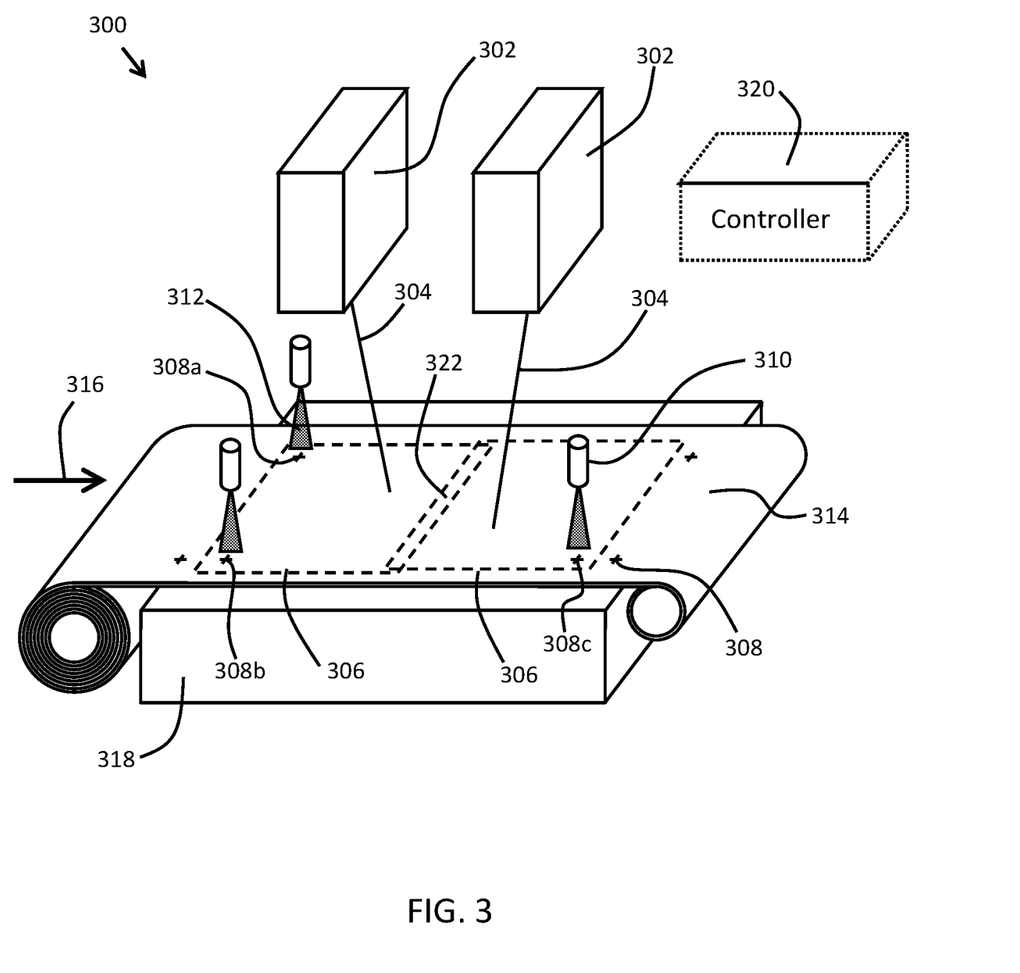
FIG. 3 is a perspective view of an apparatus in accordance with another aspect of the present invention.

Referring to FIG. 3, an exemplary embodiment of a laser patterning system 300 is shown in accordance with a further aspect of the present invention. Laser patterning system 300 includes one or more laser sources 302. Each laser source 302 typically includes a high power continuous-wave or pulsed laser source with considerable beam quality (e.g., pulsed sources may be diffraction limited, or have an $M^2$ of 2 or less) for enabling highly precise and detailed patterning. Laser source 302 includes a laser scanner configured to scan a laser source laser beam 304 across a laser field 306. Suitable laser scanners include the galvo-type, though other laser scanners capable of highly accurate scanning can be used. While two laser fields 306 are shown, in some examples additional laser fields 306 are present and stitched together. For example, four fields can be stitched together and arranged in a linear or square configuration. In another example, nine fields are stitched together in a square configuration. In still another example, six fields are stitched together in a three by two rectangular configuration. It will be appreciated that many different configurations are possible and fully within the spirit and scope of the present invention.

As shown in FIG. 3, a plurality of fiducial marks 308 and cameras 310 are shown, including three fiducial marks 308$a$, 308$b$, 308$c$ that in view of three corresponding cameras 310$a$, 310$b$, 310$c$, with each camera 310 having a camera field of view 312. The fiducial marks 308 are disposed on a laser patterning target 314, which can be a roll of flexible material that includes a transparent conductive film thereon. However, any other suitable material may be used as a processing target, such as targets requiring high precision or intricate patterns. For roll processing, the target is typically advanced in a particular direction 316. In other examples, a sheet of material can be patterned instead and advanced into position in view of the laser scanning fields however convenient. The target 314 is positioned on a support member 318 which can include a vacuum chuck to secure the target 314 in position for processing. In some system examples, the target 314 can be translated by small increments in order to bring it in view of the cameras 308 and laser scanning fields 306.

Additional fiducial marks 308 are disposed on the roll target 314 that correspond to a previously processed or subsequent portion to be processed of the roll. The three marks 308*a*, 308*b*, 308*c* are arranged with two marks 308*a*, 308*b* towards a rear portion of the laser scanning fields (i.e., in the field 306 on the left in FIG. 3) and one mark 308*c* near the front portion (i.e., in the field 306 on the right in FIG. 3). Multiple position arrangements thereof are possible for fiducial marks on selected patterning targets 314, including reversing the arrangement in FIG. 3 such that two marks 308*a*, 308*b* are arranged towards the front and the third 308*c* is arranged at the rear. In some examples, more than three fiducial marks may be present on the patterning target, and more than three corresponding cameras may be configured to view or monitor respective fiducial marks.

The component lasers 302, cameras 308, and securing components of support member 318 are in communication with a controller 320 situated in relation to the system 300. The controller 320 can include one or more controller components configured to operate and scan the lasers across the laser scanning fields according to laser pattern data, typically stored in one or more laser pattern data files. The controller 320 can be configured to apportion scanning data amongst the laser scanning fields 306, if more than one is present, such that a substantially seamless processing transition occurs in an overlapping scanning field area 322. The cameras 308 are also in communication with the controller in order to provide the laser scanning fields in accurate alignment with the target 314, as will be discussed in further detail hereinafter.

Before the system 300 is configured for processing multiple targets in sequence, each of the one or more laser scanning fields should be situated in suitable alignment with the target 314. For a plurality of fields, the alignment with the target should also include alignment between each adjacent laser scanning field. Since the performance of such alignments is time-consuming, they are typically intended to be performed infrequently instead of for each target that is processed in an assembly line.

For example, the areas of each field or of the larger global field extending across the target can be calibrated with respect to the Z-axis (i.e., perpendicular to the target) such that the topographical contour of the target and the focus of the laser away from a center position are accounted for by the laser scanning controller. Typically, a calibration target is processed using different Z-focus settings at several points in each field. The calibration target is visually inspected and the best or most appropriate values on the target are provided to the controller for future processing.

The X and Y shape of each scanning field should also be calibrated in relation to a target as well. Such calibration can be performed for each laser field by processing arrays of patterns and measuring the X, Y locations of the patterns using a coordinate measuring machine (CMM). The measurements are provided to the laser scanning controller, typically in the form of pairs of ideal and actual X,Y coordinates. To accomplish such calibration for multiple fields becomes difficult since each field must be calibrated separately to make corrections to each, and once the target is removed the data for relative rotation and degree of overlap associated with an adjacent field becomes lost.

Accordingly, for calibration of multiple fields, each field is stitched together with its adjacent fields in order to provide an alignment for a global laser field. For example, a calibration material can include half of an 'x' (e.g., a '>') deposited thereon via a first laser field, and the other half of the 'x' (e.g., a '<') deposited thereon via a second shared adjacent laser field. The two halves images are scanned with the CMM or another camera and the error in distance between the apex of each half is stored and the error in angle between opposite legs forming a line (e.g., the upper arm of the '>' and the lower arm of the '<') is recorded. The errors are then corrected for one or both of the respective adjacent laser fields by adjusting scanner translation and rotation.

Figure 4:
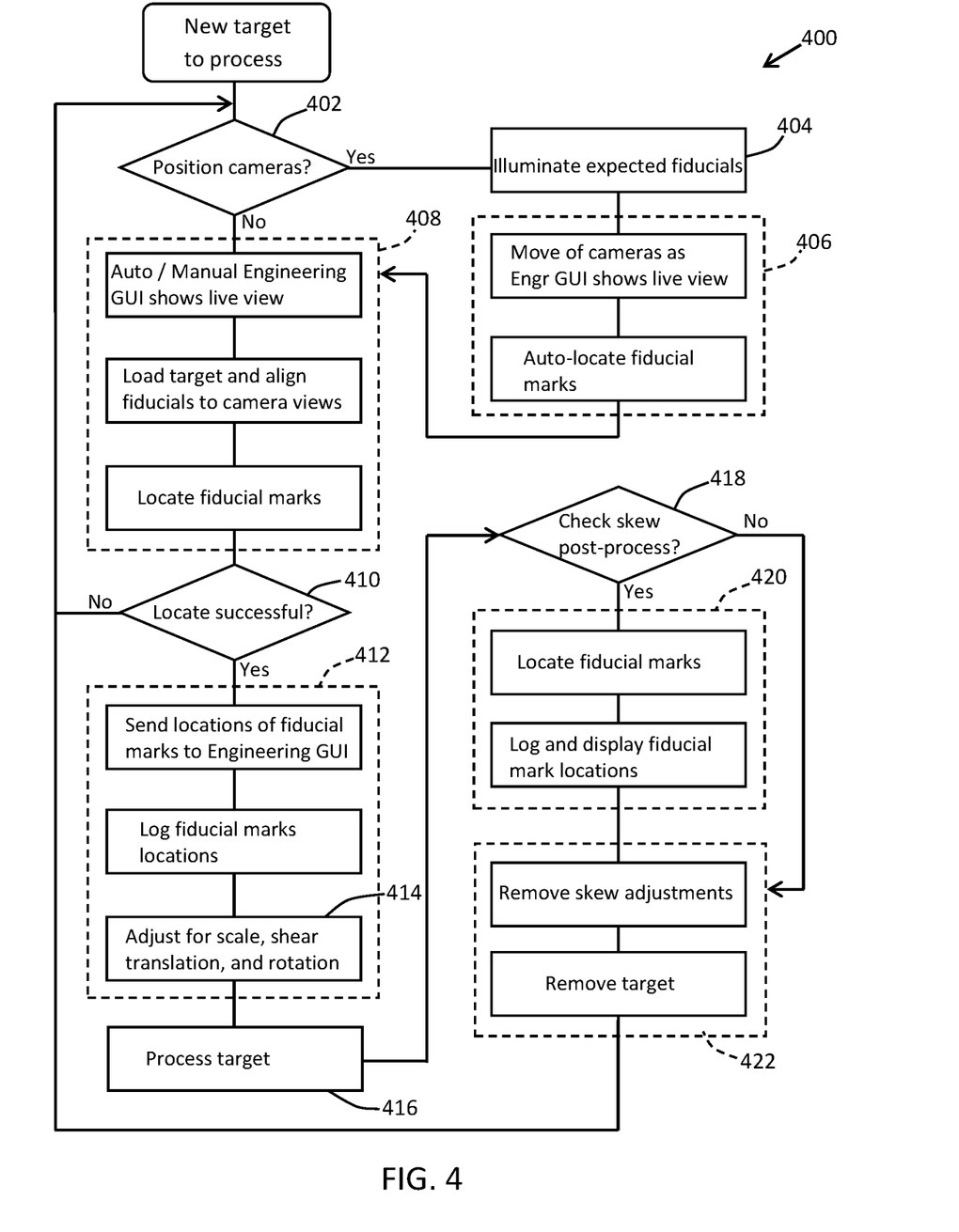
FIG. 4 is a flow chart of a method in accordance with another aspect of the present invention.

Referring to FIG. 4, a flowchart is shown for an exemplary method 400 of aligning one or more laser patterning fields with fiducials and processing an aligned target in a queue of targets, in accordance with a further aspect of the present invention. Various numbers of fiducial marks may be used or applied to a target, including in various position configurations, for one or more laser scanning fields. In particular embodiments herein, multiple laser scanning fields are stitched together for covering the processing area of a target, using a set of fiducial marks associated with the global stitched scanning field area for the target.

When there is a new target to be processed, at 402 it is determined whether fiducial mark detecting cameras (or other detectors) are to be positioned in relation to such a target. If the cameras are to be positioned, at 404 the lasers associated with the one or more laser scanning fields are energized to illuminate the expected location of fiducials on the target, stored in the controller, with or without a target being present. In some examples, a low power laser setting, seed light, or a coupled aiming laser can be used to illuminate the expected location. In some situations the illuminated locations at low power may not correspond to the locations illuminated at higher operational powers used in actual target processing. Such error can be predicted or heuristically determined (in x, y, and z directions) and stored or accessed by the controller such that the error is corrected during actual processing, including being corrected at different power levels where more or less error may be observed. Moreover, the location of the illuminated mark without a target present may not align with the illuminated location of the mark at all laser field locations when the target is present, due to the thickness of the target which itself may be quite thin. A calibration material of similar thickness to the target may be used to compensate for this difference.

At 406, the fiducial marks and the camera views are configured to automatic or manual alignment. In a manual example, an engineering graphical user interface is utilized to show the camera view to an operator. The operator can then manually or remotely move each camera in X, Y directions until each illuminated expected fiducial location is nearly centered in the respective camera. In an automatic example, the laser controller can reposition the cameras in relation to the illuminated fiducials in order to place the illuminated expected fiducial location within the camera field of view. After such manual or automatic camera movements, machine vision is used to determine respective camera coordinates of each illuminated expected fiducial location. Each of the aforementioned camera coordinates is reported to the laser system controller to use for translating the respective camera coordinates into global laser field X,Y coordinates. For example, for different batches of targets the cameras can be reoriented to align with the expected fiducial locations on the different type of target.

If the cameras are already in position for detection of the fiducial marks of the target to be processed, at 408 a target can be loaded in view of the cameras such that the fiducial marks on the target are aligned with the pre-positioned cameras. The fiducial marks on the target are detected by the cameras and it is determined at 410 whether the locate process is successful. In situations where the location is not successful, the target or the cameras can be repositioned in order to provide alignment between the actual location of fiducial marks on the target and the view of the cameras. In a successful location of the actual fiducial marks by the detection cameras, at 412 location data associated with the actual fiducial marks detected by the cameras are sent to the laser system controller for logging and dynamic laser field adjustment with respect to the logged values. In the laser controller at 414, adjustments for one or more of scale, shear, translation, and rotation are performed on the logged values. Based on the adjustments, the shape of the one or more laser scanning fields is corrected such that it aligns more closely with the actual position of the fiducial marks on the target to be processed. The target can then be processed with the one or more lasers of the high precision laser system at 416.

In a post-processing step, at 418 a determination of whether to check for a post-process skew or misalignment has occurred or accrued. If a check is to be performed, at 420 the location of the actual post-process fiducial marks are detected by the cameras and the location data is sent to the laser controller and logged. If a skew occurs that is out of tolerance, a flag can be sent to an operator or otherwise logged in association with the target that was processed. At 422 the dynamic skew adjustments applied to the laser scanning fields in 414 are removed and the target is removed from view of the lasers. For example, a vacuum chuck securing the target in place can be released and the roll or conveyor can be advanced. The process can begin again for the next target and the laser field can be quickly adjusted by the controller using new actual fiducial location detection data for efficient assembly line processing.

As mentioned hereinbefore, in order to provide dynamic correction to the one or more laser scanning fields, an algorithm can be applied which compares the detected actual fiducial mark location data and the stored expected fiducial mark locations to make the required corrections to the stored mark locations for processing the target. Corrections for rotation, translation, scale, shear, dilation, or other field characteristics can be implemented with various ordering of operations or in a single step, and such corrections can be distributed amongst one or more controller components.

Figure 5A:
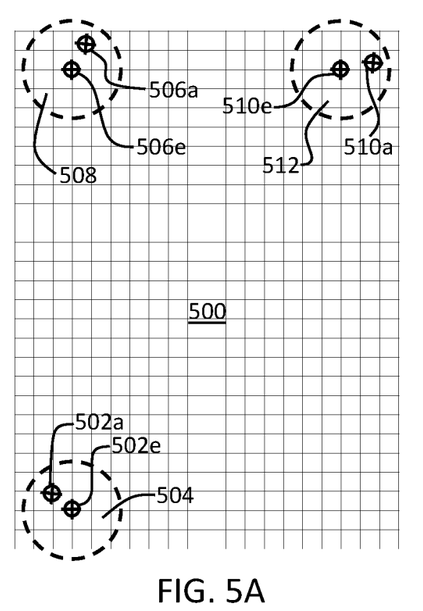
FIG. 5A-D are plan views of a target to be laser processed.
Figure 5B:
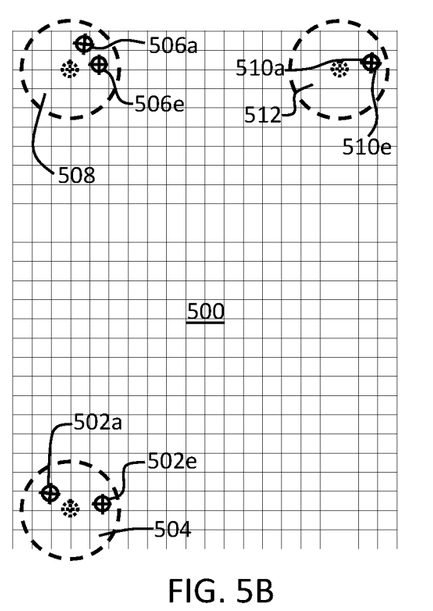

Plan views of an exemplary global laser scanning field 500 are shown in FIG. 5A-D along with one way correction may be applied thereto in accordance with an aspect of the present invention herein. In FIG. 5A, the laser scanning field 500 includes lower left actual and expected fiducial mark locations 502*a*, 502*e* disposed in a corresponding camera detection area 504, upper left actual and expected fiducial mark locations 506*a*, 506*e* disposed in a corresponding camera detection area 508, and upper right actual and expected fiducial mark locations 510*a*, 510*e* disposed in a corresponding camera detection area 512. A translation correction is applied by selecting the two actual fiducial mark locations that are farthest from each other, which are 502*a* and 510*a* in FIG. 5A. Location 510*e* can be selected and the set of stored fiducial locations can be translated such that location 510*e* is collocated or aligned with actual fiducial location 510*a*, as can be seen in FIG. 5B with the former expected locations being shown in dashed format therein.

Figure 5C:
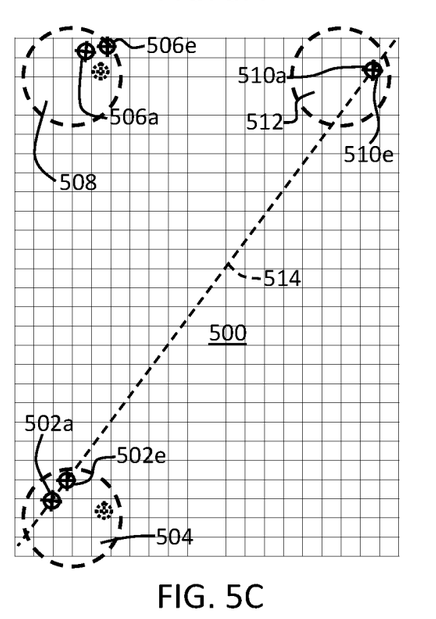
Figure 5D:
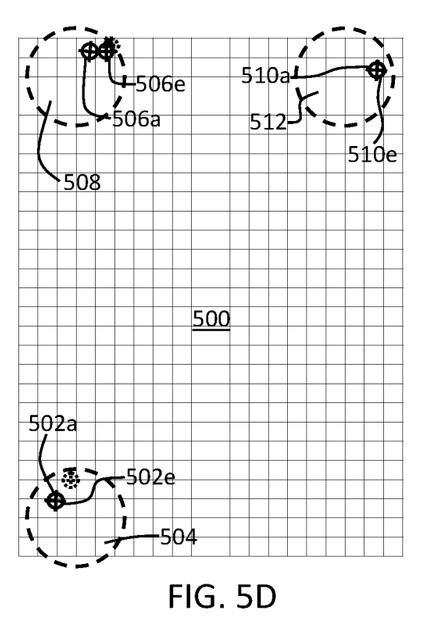

In FIG. 5C, a rotation correction is depicted that is applied to the translation corrected stored fiducial mark locations. The rotation correction is applied about an axis generally perpendicular to the scanning field 500 at the collocated points 510*a*, 510*e* and the amount of applied rotation is such that the expected fiducial mark location 502*e* becomes collinear (indicated with reference line 514) with actual fiducial mark location 502*a*. Again, former expected fiducial locations are shown in dashed format. In FIG. 5D a scaling correction is depicted that is applied to the translation and rotation corrected stored fiducial mark locations. The scaling correction can be applied using the expected fiducials exhibiting the largest distance between them, such 502*e*, 510*e* and is performed in the X and Y directions, i.e., generally parallel to the plane of the laser field 500. Again, former expected fiducial locations from the previous operation are shown in dashed format. A shear correction can also be applied in opposite directions on either side of the reference line 514 in order to collocate 506*e* with 506*a*. The transformation affecting the three expected fiducial mark locations can extend to the remaining points of the global scanning field, including the stitched together fields if more than one component laser scanning field is present, bringing the points thereof in alignment with the detected actual fiducial locations. The dynamic field correction can be applied through software very quickly such that the processing time for targets is not significantly affected thereby.

Other corrective transformations can be applied to the stored expected fiducial location data. Generally, transformations can be applied by performing matrix calculations. For example, a two-dimensional matrix affine transformation can be applied to the three stored expected fiducial locations using matrix multiplication. The top two rows of a 3×3 matrix includes a 2×2 two-dimensional transformation matrix with values M00, M01, M10, and M11, and a 2×1 translation matrix with values X and Y, representing accumulated rotation, scaling, shear, and translation corrections. The matrix is then multiplied by each stored expected fiducial location point to produce a transformed expected fiducial location point that better aligns with the detected actual fiducial locations.

The material target can then be laser processed with the one or more laser beams across the dynamically adjusted one or more laser fields. Once the material processing is complete, a check for change in skew can be performed using the detection cameras and stored data, which can assist in verifying the accuracy of the laser process on the just processed target. Some predictable skew can occur depending on the type laser pattern applied, the characteristics of the material processed, the laser parameters used, and other characteristics of the system, such as the method used for securing the target during material processing. Thus, post-process fiducial mark location error can be detected and a determination can be made whether such error is within a specified tolerance.

It is thought that the present invention and many of the attendant advantages thereof will be understood from the foregoing description and it will be apparent that various changes may be made in the parts thereof without departing from the spirit and scope of the invention or sacrificing all of its material advantages, the forms hereinbefore described being merely exemplary embodiments thereof.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, comprising:
   detecting a first portion of a set of stitching fiducials in a first field of view of a first laser processing subsystem of a laser processing system, the first laser processing subsystem including a first subsystem laser and a first subsystem laser scanner configured to scan a first subsystem laser beam according to a first laser scanning field in the first field of view;
   detecting a second portion of the set of stitching fiducials in a second field of view of a second laser processing subsystem of the laser processing system, the second laser processing subsystem including a second subsystem laser and a second subsystem laser scanner configured to scan a second subsystem laser beam according to a second laser scanning field in the second field of view;
   determining an error between the first portion and the second portion; and
   adjusting one or both of the first and second laser scanning fields based on the error to stitch together adjacent sides of the first and second laser scanning fields and form at least part of a global scanning field of the laser processing system.

2. The method of claim 1, wherein the determining the error comprises determining a translation and/or rotation error between the first portion and the second portion and the adjusting the one or both of the first and second laser scanning fields based on the error comprises translating and/or rotating one or both of the first and second laser scanning fields.

3. The method of claim 1, wherein the detecting the first portion of the set of stitching fiducials comprises detecting a first half of a line symmetric fiducial and the detecting the second portion of the set of stitching fiducials comprises detecting a second half of the line symmetric fiducial.

4. The method of claim 3, wherein the determining the error comprises determining a translation error between an apex of the first half and the second half and determining a rotation error between the first half and the second half.

5. The method of claim 4, wherein the line symmetric fiducial has an 'X' shape, the first half has a '>' shape, and the second half has a '<' shape.

6. The method of claim 1, further comprising producing the first subsystem laser beam and the second subsystem laser beam to process a metal target across the global scanning field.

7. The method of claim 1, further comprising:
   positioning a target at a working distance in the laser processing system such that a set of global scanning field fiducials are positioned in view of at least three laser processing system cameras;
   with each laser processing system camera, locating a respective global scanning field fiducial on the target and sending location data of the located global scanning field fiducial to a controller;
   determining corrections that align expected global scanning field fiducial locations with the sent global scanning field fiducial location data; and
   adjusting the global scanning field with the determined corrections.

* * * * *